United States Patent [19]

Van Hijfte et al.

[11] 4,316,736
[45] Feb. 23, 1982

[54] PROCESS FOR PREPARING STABILIZED, AMMONIUM NITRATE CONTAINING GRANULES

[75] Inventors: Willy H. P. Van Hijfte, Assenede; Rafaël A. J. Goethals, Ertvelde, both of Belgium

[73] Assignee: Compagnie Neerlandaise de l'Azote, Brussels, Belgium

[21] Appl. No.: 125,497

[22] Filed: Feb. 28, 1980

[30] Foreign Application Priority Data

Mar. 15, 1979 [NL] Netherlands ............... 7902086

[51] Int. Cl.³ ............................................. E05B 73/02
[52] U.S. Cl. .................................. 71/59; 71/58; 71/60; 71/64 DB
[58] Field of Search ............ 71/64 G, 64 D, 58, 59, 71/64.6; 427/213

[56] References Cited

U.S. PATENT DOCUMENTS

| | | | |
|---|---|---|---|
| 2,782,108 | 2/1957 | Antle | 71/58 |
| 3,117,020 | 1/1964 | Fabris | 427/213 |
| 4,124,368 | 11/1978 | Boyais | 71/59 |
| 4,219,589 | 8/1980 | Niks | 427/213 |

Primary Examiner—Sam Silverberg
Attorney, Agent, or Firm—Scully, Scott, Murphy & Presser

[57] ABSTRACT

Stabilized $NH_4NO_3$ containing granules are produced by dissolving in an aqueous $NH_4NO_3$ solution $Mg(NO_3)_2$ and, if desired, suspending mineral filler, spraying the resulting solution or suspension over nuclei maintained in spaced interrelationship and contacted with a hot stream of gas at a temperature of the nuclei of between 120° and 135° C., and cooling the resulting granules in such a manner that, between 70° C. and 50° C., they remain substantially homogeneous in temperature.

7 Claims, No Drawings

PROCESS FOR PREPARING STABILIZED, AMMONIUM NITRATE CONTAINING GRANULES

This invention relates to a process for preparing stabilized ammonium nitrate containing granules.

Ammonium nitrate may occur in a number of different crystal modifications, depending on the temperature. The transitions from one crystal modification to another, and especially the transition at approximately 32° C. from modification III to modification IV and vice versa, is accompanied by effects of shrinkage and expansion of the crystals, whereby stresses are generated in the crystal structure. When ammonium nitrate granules pass the limit of approximately 32° C. a number of times alternately in either direction, the results of the stresses which occur are that the granules become more porous, swell, loose their crushing strength, and in the end disintegrate into powder. These effects occur not only with granules consisting entirely of ammonium nitrate, but also with granules which contain ammonium nitrate and one or more mineral fillers, such as granules of calcium ammonium nitrate or of magnesium ammonium nitrate. Such effects of disintegration are very troublesome in regions where during the day the temperature generally rises above approximately 32° C. and in the night decreases below this value, but also in moderate regions, if the granules are stored in the open air, either in bulk or packed in plastic bags.

High-porosity ammonium nitrate granules will generally explode in the E.E.C. explosibility test (see Official Journal of the European Communities, No. C 16/4 of Jan. 23, 1976). Conversely, low-porosity granules will generally not explode in this test; such granules are termed stable ammonium nitrate granules. Hitherto, ammonium nitrate granules having such a low porosity that they do not involve the risk of explosion can only be obtained by prilling or granulating a substantially anhydrous ammonium nitrate melt having a concentration of generally 99.8% by weight and higher, whereby high density prills or granules are formed. Such so-called stable granules, however, commonly loose their stability when they have repeatedly passed the limit of approximately 32° C. by heating and cooling, for example, when they are subjected to five temperature cycles between 25° C. and 50° C. in the E.E.C. explosibility test. They then exhibit the effects described above, which lead to disintegration, and generally explode when subjected to the E.E.C. explosibility test. This applies not only to granules consisting entirely of ammonium nitrate, but also to granules containing ammonium nitrate and one or more mineral fillers to the extent they have a nitrogen content of at least 28%. According to E.E.C. directives, ammonium nitrate containing fertilizer granules having a nitrogen content of at least 28% may only be marketed if the granules are stable.

It is known that ammonium nitrate granules of improved stability can be obtained by prilling or granulating a substantially anhydrous ammonium nitrate melt having a concentration of 99.8% by weight or higher, and to which a stabilizer has been added which specifically retards or prevents re-crystallization. Various stabilizers have been proposed, such as potassium nitrate, aluminium sulfate and magnesium nitrate (J. Agr. Food Chem. 19, No. 1 (1971), p. 83), a mixture of boric acid or an alkali metal or ammonium salt thereof with mono- or diammonium phosphate and diammonium sulfate (U.S. Pat. No. 3,317,276) and aluminium, magnesium, and/or calcium silicate containing clays in finely-divided condition (U.S. Pat. No. 3,379,496). Some of these materials are used in practice for the production of stabilized ammonium nitrate prills and granules.

A disadvantage of the prior art procedures for the production of stabilized ammonium nitrate granules is that they require a substantially anhydrous ammonium nitrate melt having a concentration of generally 99.8% by weight and higher.

The reason is that for maximum stability the ammonium nitrate granules must have minimum porosity (i.e. maximum density). According as the ammonium nitrate melt used for the production of granules contains more water, more water must be evaporated from the granules formed by prilling or granulation, so that more pores and channels are left in the granules.

It is an object of the present invention to provide a process using lower-concentration aqueous ammonium nitrate solutions having a concentration of at least 80% by weight to produce ammonium nitrate containing granules having a good roundness and a smooth closed surface, a high density, high crushing strength, a high resistance to the formation of fines upon impacts to the formation of fly dust resulting from rubbing together, and an adjustable grain size, for example, a diameter between 2 and 12 mm, which granules remain free-flowing even upon prolonged storage, are resistant to repeated temperature fluctuations between −20° C. and +60° C., without thereby becoming weaker, swelling or disintegrating into powder and therefore permit storage in closed bags in the open air, without loss in quality under conditions varying from an arctic to a tropical climate, and when subjected to the E.E.C. explosibility test to not explode, even after five temperature cycles between 25° C. and 50° C.

According to the present invention, this object is achieved by dissolving in an aqueous ammonium nitrate solution having an ammonium nitrate concentration of at least 80% by weight, $Mg(NO_3)_2$ in a proportion of 0.5–3.0% by weight calculated on the ammonium nitrate in the solution, and suspending finely-divided mineral filler in a proportion of 0–45% by weight, calculated on the total of ammonium nitrate and filler in the suspension, spraying the resulting solution or suspension over solid nuclei while these are maintained in essentially spaced interrelationship in an agitated particle bed or mass and contacted with a hot stream of gas while the temperature of the sprayed nuclei is maintained between 120° and 135° C., to deposit droplets of the sprayed solution or suspension on the nuclei, which are dried in situ with removal of evaporated water by the stream of gas until a desired grain size has been reached, and thereafter cooling the resulting granules by means of a cooling medium to a temperature below 50° C. in such a manner that the granules remain substantially homogeneous in temperature in the cooling range of from 70° C. to 50° C.

In a first embodiment, the process according to the invention is used for the production of stabilized high-density ammonium nitrate granules, with the starting product being an aqueous ammonium nitrate solution in which $Mg(NO_3)_2$ is dissolved.

In a second embodiment, the process according to the invention is used for preparing stabilized ammonium nitrate containing fertilizer granules, such as calcium ammonium nitrate or magnesium ammonium nitrate granules, with the starting product being a suspension of mineral filler in an aqueous ammonium nitrate solution in which $Mg(NO_3)_2$ is dissolved.

Calcium ammonium nitrate is a chemically obtained product containing ammonium nitrate as its essential ingredient, and in addition mineral fillers, in particular calcium carbonate (limestone, marl, chalk), magnesium carbonate or calcium magnesium carbonate (dolomite). Calcium ammonium nitrate contains at least 20% by weight of nitrogen in the form of nitrate and ammoniacal nitrogen, each of which two forms should constitute approximately half of the nitrogen present, and at least 20% by weight of one or more of the carbonates listed, the purity level of which should be at least 90% by weight (see Official Journal of the Europeen Communities dated 30.1.76 No. L 24/25).

Magnesium ammonium nitrate is a chemically obtained product containing nitrates and ammonium salts and magnesium compounds (dolomite, magnesium carbonate and/or magnesium sulfate) as essential ingredients. Magnesium ammonium nitrate contains at least 90% by weight of nitrogen in the form of ammoniacal and nitric nitrogen, with the content of nitric nitrogen being required to be at least 6% by weight, and at least 5% by weight of magnesium soluble in mineral acid, expressed as magnesium oxide (see Official Journal of the Eurpeen Communities dated 30.1.76, No. L. 24/26).

In the second embodiment of the process according to the invention, the starting suspension is prepared by suspending in an aqueous ammonium nitrate solution having an ammonium nitrate concentration of at least 80% by weight, and in which 0.5-3.0% by weight of $Mg(NO_3)_2$ has been dissolved, calculated on the ammonium nitrate in the solution, finely-divided mineral filler in a proportion of no more than 45% by weight, calculated on the total of ammonium nitrate and filler in the suspension. Preferred mineral fillers are limestone, marl, chalk, dolomite, magnesium carbonate and/or magnesium sulfate. It is also possible, however, in order to reduce the nitrogen content, to use other fillers, such as gypsum, clay and the like. The mineral filler preferably has a particle size of less than 0.2 mm with an average particle size of approximately 0.05 mm.

In the process according to the invention, the granules are built up by alternately moistening solid particles with the ammonium nitrate containing solution or suspension and drying, during which process agglomeration of the moistened particles must be prevented. For this purpose the solution or suspension is sprayed into an agitated particle bed or mass in which during the spraying the particles are maintained in essentially spaced interrelationship and contacted with a hot stream of gas. The hot stream of gas supplies the heat required for the evaporation of water from the droplets deposited on the particles and removes evaporated water. The available quantity of heat should be adequate to sufficiently dry the sprayed particles in a short time to render agglomeration impossible when they come again into contact with each other by striking against each other or otherwise. All this can be realized using conventional techniques. Suitable examples of such techniques are the fluidization technique, the spouted-bed technique and the spherodizer technique.

When the fluidization technique is used for the subject purpose, a bed of solid particles resting on a grid is fluidized and maintained in fluidized condition by means of a hot stream of gas supplied via the grid upwardly through the bed, while the solution or suspension is sprayed into the fluidized bed through one or more nozzles. By a suitable control of the quantities and temperature of the fluidization gas and the solution or suspension to be sprayed, it can be achieved that the particles in the bed are alternately moistened with the solution or suspension and dried. Further information about the fluidization technique is found for example, in the book by Daizo Kunii and Octave Levenspiel: "Fluidization Engineering", John Wiley & Sons, New York (1969).

The spouted-bed technique is described in British Pat. No. 962,265. When that technique is used for the subject purpose there is provided a bed of solid particles contained in a vessel, and a hot stream of gas is supplied through a central aperture in the bottom of the vessel at such a velocity as to form a dilute phase of particles entrained by this stream of gas in the central portion of the bed, in which dilute phase the solution or suspension is sprayed, preferably in the bottom of the bed. In the dilute phase in the central portion of the bed the particles are entrained by the stream of gas to above the bed level, and then fall back on to the annular portion of the bed between the central portion of the bed and the vessel wall, in which annular portion they sink again until they are again entrained by the stream of gas and are sprayed. During their residence in the dilute phase, these moistened particles must be sufficiently dried to prevent agglomeration when they fall back onto the annular portion. This can easily be achieved by a suitable selection of the temperature of the stream of gas and of the quantity of solution or suspension to be sprayed per unit of time. A plurality of parallel spouted beds may be combined into one multiple spouted bed by having a bed in a large-diameter vessel, in which a plurality of gas streams are supplied through the vessel bottom at suitable distances from each other, and spraying the solution or suspension in each of the dilute phases formed. As the dimensions of the particles or granules to be treated cause no problems in a spouted bed, which they may in fuidized bed, it may be advantageous for the subject purpose to combine one or more fluidized beds with one or more spouted beds. Further information on the spouted-bed technique and on possible combination is found in the book by Kishan B. Mathur and Norman Epstein: "Spouted Beds", Academic Press, New York (1974).

The spherodizer technique is described in British Pat. No. 894,773. In this technique, use is made of a rotary drum having longitudinal blades provided on its inner wall. Sprayers are arranged at suitable positions within the drum. When this technique is used for the subject purpose, the particles and a hot stream of gas are introduced at the supply end of the drum. The blades secured to the inner wall of the rotary drum carry along particles lying on the bottom and after a certain portion of the revolution allow these to slide off again, whereby the particles fall as rain in spaced interrelationship through the drum. During their fall, the particles are sprayed through the sprayers with the solution or suspension, and the thus moistened particles are dried by the hot stream of gas. By a suitable selection of the temperature of the gas stream and of the quantity of solution or suspension sprayed per unit of time, it can be achieved that before contacting each other again on the drum bottom the particles are sufficiently dried to prevent agglomeration.

Naturally other suitable techniques may be employed.

Various research workers assume that in the granulation of a substantially anhydrous $Mg(NO)_2$ containing ammonium nitrate melt, the $Mg(NO_3)_2$ mainly functions as a moisture binder in that the water present in the granules formed is chemically bound to the $Mg(NO_3)_2$ as water of crystallization. Such granules are then dry in a physical-chemical sense. As the transitions between crystal phases proceed through the mother liquor phase (see Proceedings of the Royal Society 266 (1962) 329), the phase transitions in such granules proceed so slowly that the granules practically do not suffer adverse effects from temperature fluctuation.

According to the present invention it has been found that in the granulation of lower-concentration, $Mg(NO_3)_2$ containing ammonium nitrate solutions, the $Mg(NO_3)_2$ plays a further role, the result of which is that independently of the concentration of the sprayed ammonium nitrate solution, there are always obtained high-density granules. One explanation is that the (anhydrous) binary system $NH_4NO_3$-$Mg(NO_3)_2$ exhibits a eutectic point at approximately 115° C., above which temperature all $Mg(NO_3)_2$ present is in solution in the ammonium nitrate. A granule consisting of ammonium nitrate containing 2% by weight of $Mg(NO_3)_2$ contains at temperatures above the eutectic point a liquid phase, the proportion of which depends on the temperature as per the following table.

| Temperature °C. | % by weight liquid phase in the granule | composition liquid phase $Mg(NO_3)_2$, % | $NH_4NO_3$, % |
|---|---|---|---|
| 120 | 9.4 | 21.1 | 78.9 |
| 130 | 11.3 | 17.8 | 82.2 |
| 140 | 14.0 | 14.2 | 85.8 |

In practice the granules contain 0.1–0.5% water, so that the proportion of liquid phase in the granules will be still greater.

In the process according to the present invention, the granules being built accordingly contain a considerable proportion of liquid phase, which is the cause of the granules being plastic and owing to the many instances of bumping into each other and rubbing against each other during their formation, getting a great roundness and a smooth, closed surface. When the granules are cooled in a next phase of the process, the ammonium nitrate and the magnesium nitrate crystallize in the pores of the granules, as a consequence of which there is obtained a product having a very high density and extremely low porosity, which is particularly hard and impact-resistant.

It has further been experimentally found that the manner in which the granules produced according to the invention are cooled has a very important effect on the stability of the granules against disintegration. In particular, it has been found to be necessary for the granules to be cooled to a temperature below 50° C. in such a manner that they remain substantially homogeneous in temperature in the range of from 70° C. to 50° C. Preferably this is achieved by cooling the granules with a desired size between 70° C. and 50° C. at a uniform rate of at most 3° C. per minute.

This aspect of the invention is illustrated by the following tests.

Ammonium nitrate granules having an average diameter of 4 mm were prepared in accordance with the present invention by spraying a 95% by weight ammonium nitrate solution containing 2% by weight $Mg(NO_3)_2$ into a fluidized bed of solid ammonium nitrate particles, during which process the temperature of the granules being built was maintained between 125° and 130° C. The granules were removed from the bed at a temperature of approximately 120° C. and subsequently cooled with ambient air to approximately 90° C. Thereafter the product was sieved and the granules having the desired diameter were further cooled.

A portion of the granules (granules A) was cooled with ambient air to 30° C. over a period of 3 minutes. The granules A thus cooled exhibited the exceptionally high density of 1.68.

Another portion of the granules (granules B) was cooled at a uniform rate to 50° C. over a period of 15 minutes, using air of 50° C. The granules B thus cooled had a density of 1.63–1.64, i.e. considerably lower than 1.68.

On the ground of experience and of the literature, it could be expected that granules A which have the greater density, also exhibited the greater resistance against disintegration. When the cooled granules A and B were subjected to five temperature cycles between 25° C. and 50° C., however, it was found that the density of the rapidly cooled granules A decreased from 1.68 to 1.57, which is indicative of an increase in porosity and of a corresponding swelling, whereas the density of the granules B, cooled slowly and at a uniform rate, remained unchanged 1.63–1.64. Against expectation, granules A turned out to be gravely caked together when stored in closed bags, whereas granules B even when stored for a long period of time in surroundings having a fluctuating temperature remained free flowing.

One possible explanation for these effects is that when the granules are cooled too fast at least a portion of the magnesium nitrate cannot arrive at crystallization, but remains present within the granules as an amorphus solid. In that condition the $Mg(NO_3)_2$ cannot bind water as water of crystallization, so that the granules continue to contain free water which upon storage causes caking together and owing to the formation of a mother liquor phase promotes the phase transition between the crystal modification and hence the disintegration of the granules.

In the light of countless tests we have determined that the critical range within which the granules must be slowly and uniformly cooled in the manner described is between 70° C. and 50° C. The granules may be cooled from a high temperature to 70° C. and from 50° C. to ambient temperature at any desired rate without detracting from the quality or characteristics of the granules.

The concentration of the ammonium nitrate solution to be used for the process according to the invention is basically not critical, but there are economic considerations which make the use of unduly low concentrations less desirable. According as the concentration of the solution is selected lower, the product yield per unit of time is lower and the quantity of water that must be evaporated per unit of time is larger. Practice has taught that an acceptable granule yield can be obtained using an ammonium nitrate solution having a concentration of at least 80% by weight without the drying of the sprayed granules presenting any problems. Preferably, however, solutions having a concentration of 90–95% by weight are used, for one thing because such solutions are inexpensive compared with the anhydrous melt required for the prior art production of high-density ammonium nitrate granules, and for another because they give excellent granule yields. As an upper limit for the concentration, if any is needed, may be mentioned the concentration of the practically anhydrous ammonium nitrate melt required for the prior art processes, which is approximately 99.7% by weight and any rate at least 99.5% by weight.

The ammonium nitrate containing solution or suspension to be used for the process according to the present invention contains 0.5–3.0% by weight of $Mg(NO_3)_2$, which may be added to the solution or suspension as a hydrate or may formed in the solution in situ by adding MgO in a proportion corresponding to the desired magnesium nitrate content of the solution, followed by reaction to form magnesium nitrate. When, within the range of 0.5–3.0% by weight, the higher magnesium nitrate contents of the solution or suspension are used, the temperature of the granules during their formation is preferably selected lower within the range of 120° to 135° C., as the quantity of liquid phase in the granules depends on both the magnesium nitrate content and the temperature. The result is that a combination of a high magnesium nitrate content of the solution of suspension with a high temperature of the granules during their formation may lead to the granules exhibiting undue plasticity owing to the presence of a large proportion of liquid phase. Preferably, an ammonium nitrate containing solution or suspension with an $Mg(NO_3)_2$ content of 1.0–2.0% by weight is used, at which concentration no undue plasticity occurs within the range of 120°–135° C.

We have found that at a formation temperature in excess of 135° C., the granules become so plastic as to agglomerate easily, especially the smaller granules, and to cake to the bottom plate, and that at a formation temperature below 120° C. the formation of fines begins to occur. At temperatures of approximately 110° C. and lower, granulation is impossible and fines are formed only.

The drop size of the sprayed solution or suspension is not critical. In practice, excellent results are achieved with average drop diameters of between 0.01 and 0.1 mm, but larger average diameters have proved to be quite suitable, in particular in spouted beds.

As nuclei, small ammonium nitrate prills or undersized sieved product granules may be used. It is also possible for oversized product granules to be ground and recycled to granulation. The nuclei may be also consist of other substances with have no adverse effect in the product. If desired, inert nuclei may be used.

The granulation according to the present invention may be carried out continuously or batchwise. The granules having a desired granulometry are preferably cooled immediately after their production to reduce their plasticity. According to the invention, the product granules should be cooled so that, in the cooling range of 70° C. to 50° C., the granules remain substantially homogeneous in temperature. This is preferably achieved by cooling the granules in the said cooling range at a uniform cooling rate of no more than 3° C. per minute. Cooling may be effected in conventional apparatus. Practice has shown, however, that when the granules are cooled in a fluidized bed a uniform cooling rate of no more than 3° C. per minute is difficult to achieve, since the granules are cooled at a faster rate in the bottom portion of the bed than those in the top portion, unless the cooling gas, commonly consisting of air, has been pre-heated to approximately 50° C., which may be an economic advantage. Partly in this connection it is preferable to perform the cooling of the product granules in the cooling range of 70° C. to 50° C. in a cooling drum with air of, for example, 25°–35° C., which has been conditioned to reduce its water content, in such a manner that during the cooling process adsorption of moisture from the cooling air by the granules is minimized.

To reduce their plasticity, the product granules are preferably cooled immediately after their production to a temperature located at a safe margin above 70° C., for example, between 80° and 90° C. This cooling can be effected at any desired rate, for example, with air of ambient temperature. It is recommendable for the granules to be subsequently sieved, whereafter the undersized fraction can be directly recycled to granulation and the oversized fraction can first be broken and subsequently recycled to granulation, and then to subject the fraction having the desired dimensions to the above-described cooling through the range of 70° C. to 50° C. The cooling from 50° C. to the ambient temperature can again take place at any desired rate. For example, the granules cooled to 50° C. or a lower temperature may be packed in bags and allowed to cool in the surroundings.

If desired, the sieving of the granules may be postponed until the granules have cooled to 50° C. or a lower temperature. This, however, has the disadvantage that the undersized and oversized fraction must also be subjected to the particular cooling process through the temperature range of 70° C. to 50° C., and subsequently must be re-heated before being recycled to granulation.

It is also possible for the product granules to be cooled from the temperature at which they are removed from the granulator to below 50° C. at a uniform cooling rate of no more than 3° C. per minute, but this does not offer any particular advantages.

The invention is illustrated in and by the following examples. In all examples the density of the resulting granules was determined by "TVA Procedures for determining physical properties of fertilizers", Special Report No. S-444 (September, 1970), page 9 "Apparent density of fertilizer granules", Applied Research Branch, Division of Chemical Development, Tennessee Valley Authority, Muscle Shoals, Ala.

EXAMPLE I

To a 95% by weight ammonium nitrate solution, 0.6% by weight of MgO was added, whereafter the mixture was allowed to react at 170° C. for 2 hours. The solution then contained approximately 2% by weight of $Mg(NO_3)_2$.

In a fluid-bed granulator provided with two sprayers and a bottom plate having a passage area of 7%, 40 kg ammonium nitrate prills (33.5% N) having an average diameter of 2.4 mm was fluidized with approximately 1200 $Nm^3$ fluidization air per hour to a bed height of approximately 30 cm.

The above described ammonium nitrate solution was sprayed into the fluidized bed at a temperature of 150° C. and at a rate of 120 kg/hour through the two sprayers, by means of air of 160° C. and at a pressure of 245.2 kPa. The temperature of the bed was adjusted at 130° C. by controlling the temperature of the air of fluidization.

After 15 minutes, the average diameter of the granules formed was 2.95 mm, after 30 minutes 3.75 mm, after 45 minutes 4.50 mm and after 1 hour 5.35 mm. After an operating period of 1 hour the test was discontinued. The Granules were removed from the granulator, immediately cooled with outside air to approximately 90° C., and subsequently sieved. Of the resulting product, 93 kg had a grain diameter of 4-6 mm, 31 kg a diameter of less than 4 mm and 36 kg a diameter of more than 6 mm.

The product having a grain size of 4-6 mm was divided into three portions, which were cooled in a cooling drum at various cooling rates. The manners of cooling and the results thus obtained are summarized in Table A.

TABLE A

|  | Portion A | Portion B | Portion C |
|---|---|---|---|
| Temperature cooling air °C. | 50 | 40 | 30 |
| Duration of the cooling process, min. | 14 | 14 | 10 |
| Final temperature | 50 | 40 | 30 |
| Density after cooling | 1.634 | 1.658 | 1.662 |
| ditto after 5 cycles between 25° C. and 50° C. | 1.630 | 1.585 | 1.553 |
| Swelling, % | | | |
| after 1 cycle | 0 | 6 | 4 |
| after 2 cycles | 0 | 12 | 8 |
| after 5 cycles | 0 | 12 | 14 |
| after 10 cycles | 0 | 20 | 22 |
| after 20 cycles | 0 | fines | fines |
| after 50 cycles | 2 | | |

The results show that the cooling procedure to which portion A was subjected was the only one that resulted in a stable product having a high density.

The swelling of ammonium nitrate granules after being subjected to one or more temperature cycles between 25° and 50° C. can be measured in a simple manner by subjecting a given quantity by weight of the granules in a well-sealed bottle repeatedly to temperature cycles between 25° and 50° C., and after each cycle measuring the volume of the same quantity by weight of granules, for example, in a measuring cylinder. The increase in volume is a measure for the swelling.

The granules of portion A produced in accordance with the present invention had an excellent roundness and a smooth closed surface. The product exhibited an oil retention (a measure for its porosity; see: Official Journal of the European Communities dated 23.1.76 No. C 16(4-7)) of 0.95% and contained 0.30% by weight of water and 1.65% by weight of Mg(NO$_3$)$_2$. A 10% by weight aqueous solution of the product had a pH of 6.6. The granules having a diameter of 4 mm exhibited a crushing strength of 35.3 N.

EXAMPLE II

In a similar manner as described in Example I, a solution containing approximately 2% by weight Mg(NO$_3$)$_2$ was prepared by adding MgO to a 97.5% by weight ammonium nitrate solution, and subsequent reaction. Portions of the resulting solution were diluted with water to form respective ammonium nitrate concentrations of 85%, 90% and 95% by weight.

For purposes of comparison, there were prepared 95% by weight ammonium nitrate solutions respectively containing aluminum sulfate, bentonite, ammonium polyphosphate and a mixture of boric acid, diammonium phosphate and diammonium sulfate.

In a series of tests, the resulting solutions were sprayed, in the manner described in Example I, into a fluidized bed of ammonium nitrate prills, with the understanding that the 85% solution was sprayed at a temperature of 110° C. at a rate of 80 kg/hour, the 90% solution at a temperature of 120° C. at a rate of 120 kg/hour, the 95% solution at a temperature of 150° C. at a rate of 200 kg/hour and the 97.5% solution at a temperature of 170° C. at a rate of 200 kg/hour.

All tests were discontinued after an operating period of 1 hour, whereafter the product was removed from the bed, immediately thereafter cooled to 80° C. with outside air in a fluid-bed cooler and subsequently sieved. The fraction with a grain size of between 4 and 8 mm was then cooled to 50° C. in a drum cooler with air of 30° C. at a uniform cooling rate in the course of 15 minutes, whereafter the product was allowed to cool to ambient temperature in bags.

The results of these tests are listed in Table B. These results clearly show that with stabilizers other than magnesium nitrate no stable ammonium nitrate granules are produced, if the starting product is a solution with an NH$_4$NO$_3$ concentration of 95% by weight, but the process of the present invention produces stable ammonium nitrate granules of high density when solutions having NH$_4$NO$_3$ concentrations of between 85 and 97.5% by weight are used.

TABLE B

| Concentration NH$_4$NO$_3$ solution, % by weight | 85 | 90 | 95 | 95 | 97.5 | 97.5 |
|---|---|---|---|---|---|---|
| Stabilizer | 1.75% by weight Mg(NO$_3$)$_2$ | 1.85% by weight Mg(NO$_3$)$_2$ | none | 1.95% by weight Mg(NO$_3$)$_2$ | none | 2% by weight Mg(NO$_3$)$_2$ |
| Product | | | | | | |
| moisture, % by weight | 0.34 | 0.30 | 0.13 | 0.30 | 0.15 | 0.25 |
| pH 10% by weight solution | 6.1 | 6.6 | 6.2 | 6.0 | 6.1 | 6.1 |
| crushing strength $\phi$ 4 mm, N | 37.3 | 35.3 | 32.4 | 38.2 | 31.4 | 39.2 |
| density | 1.63 | 1.63 | 1.55 | 1.63 | 1.58 | 1.63 |
| oil retention, % | 1.0 | 1.0 | 1.0 | 1.0 | 0.9 | 0.9 |
| ditto, after 5 cycles between 25° and 50° C. | 1.1 | 1.0 | 6.1 | 1.0 | 6.0 | 1.1 |
| Swelling, % | | | | | | |
| after 3 cycles | 0 | 0 | 18 | 0 | 20 | 0 |
| after 5 cycles | 2 | 2 | 40 | 0 | 43 | 0 |
| after 10 cycles | 4 | 2 | 65 | 2 | 63 | 2 |
| Stability | good | good | none | good | none | good |
| Concentration NH$_4$NO$_3$ solution, % by weight | 95 | 95 | 95 | 95 | | |
| Stabilizer | 1.5 wt. % Al$_2$(SO$_4$)$_3$ | 2 wt. % bentonite | 1 wt. % NH$_4$-polyphosphate | 0.15 wt. % boric acid + 0.2 wt. % di(NH$_4$)phosphate + 0.1 wt. % di(NH$_4$) sulfate | | |

TABLE B-continued

| Product | | | | |
|---|---|---|---|---|
| Moisture, % by weight | 0.63 | 0.21 | 0.20 | 0.34 |
| pH 10% by weight solution | 4.9 | 6.2 | 5.2 | 5.2 |
| Crushing strength φ 4 mm, N | 50.0 | 29.4 | 55.9 | 45.1 |
| density | 1.54 | 1.54 | 1.52 | 1.54 |
| Oil retention, % | 0.5 | 1.0 | 0.9 | 0.8 |
| ditto after 5 cycles between 25° and 50° C. | 5.8 | 9.8 | 6.7 | 5.2 |
| Swelling, % | | | | |
| after 3 cycles | 11 | 18 | 11 | 11 |
| after 5 cycles | 26 | 36 | 38 | 26 |
| after 10 cycles | 46 | 60 | 53 | 46 |
| Stability | none | none | none | none |

EXAMPLE III

In the manner described in Example I, a solution of approximately 2% by weight $Mg(NO_3)_2$ in a 95% by weight aqueous ammonium nitrate solution was prepared. In this solution, 4% by weight of dolomite with a particle size of less than 0.2 mm was suspended.

The resulting suspension was granulated in a spouted bed. The granulation was carried out in a cylindrical vessel having a conical bottom. The cylindrical portion was 25 cm in diameter and 50 cm high, and the conical portion was 20 cm high. The conical bottom was provided with a central opening having a diameter of 4 cm, to which was connected an air conduit having a diameter of 8 cm, restricted to a diameter of 4 cm at the end connected to the central opening. A liquid sprayer was disposed so that its nozzle was positioned in the restriction formed by the central opening.

The vessel was filled to a bed height of 30 cm with calcium ammonium nitrate granules (33.5% N) with a grain size of 0.5–2.5 mm. To this bed, air of a temperature of 130°–140° C. was supplied at a gauge pressure of 9.8 kPa at a rate of 400 $Nm^3$/hour to form a spouted bed. Through the sprayer, the suspension, of a temperature of 160° C., was sprayed at a pressure of 150 kPa at a rate of 120 kg/hour in coarse droplets into the stream of air accelerated by the restriction, which gave the granules in the dilute phase in the central portion of the bed a high velocity, owing to which the suspension was distributed over the granules substantially homogeneously.

The temperature in the bed was 120° C.

After an operating period of 1 hour, the granulation was discontinued. Immediately thereafter the product was removed from the vessel and cooled in a drum cooler with air of 30° C. to approximately 45° C. in the course of 30 minutes.

The product had the following properties:

| | |
|---|---|
| Moisture content | 0.35% |
| Crushing strength, φ 4 mm | 37.3 N |
| Density, g/cm³ | 1.63 |
| Oil retention | 1.0% |
| ditto after 5 cycles between 25° C. and 50° C. | 1.1% |
| Swelling, % | |
| after 3 cycles | 0 |
| after 5 cycles | 2 |
| after 10 cycles | 4 |
| Stability | good |
| Outward appearance | round granules having a smooth surface |

EXAMPLE IV

The suspension described in Example III was granulated in two tests in a combined fluidized and spouted bed. In both tests, a bed of calcium ammonium nitrate granules (33.5% N) with a grain size of 0.5–2.5 mm is fluidized and maintained in the fluidized state by means of air.

In the first test, the suspension was sprayed into the bed by means of two pneumatic sprayers. The secondary air on the sprayers served not only to atomize the suspension, but also to give the granules in the spraying zone a higher velocity owing to the local formation of a spouted bed, which resulted in faster replacement of the granules and a substantially homogeneous distribution of the suspension over the granules.

In the second test, a hydraulic sprayer was used, placed in a blanket of secondary air. The suspension was atomized under the influence of the liquid pressure. In this test, too, the secondary air around the sprayer served to give the granules in the spraying zone a higher velocity owing to the local formation of a spouted bed with the same effect as in the first test.

Both tests were discontinued after an operating period of 1 hour. In both cases the entire product was immediately transferred to a drum cooler, in which it was cooled to approximately 45° C. in the course of 30 min., using air of 30° C.

The conditions and results of these tests are summarized in Table C.

TABLE C

| | Test | |
|---|---|---|
| | 1 | 2 |
| Conditions | | |
| Air of fluidization | | |
| Rate, Nm³/hour | 1000–1200 | 1000 |
| Temperature, °C. | 140–150 | 130–140 |
| Gauge pressure, kPa | 11.8 | 9.8 |
| Secondary air | | |
| Rate, Nm³/hour | 120 | 120 |
| Temperature, °C. | 160 | 120 |
| Pressure, kPa | 253 | 152 |
| Fluidized bed | | |
| Bed height, cm | 30–40 | 40–50 |
| Temperature, °C. | 120–130 | 120 |
| Suspension | | |
| Rate, kg/hour | 120 | 180 |
| Temperature °C. | 160 | 160 |
| Pressure, kPa | 150 | 608 |
| Product | | |
| Moisture content, % | 0.30 | 0.32 |
| Crushing strength, φ 4 mm, N | 38.2 | 41.2 |
| Density, g/cm³ | 1.63 | 1.63 |
| Oil retention, % | 1.0 | 0.8 |
| ditto after 5 cycles between 25° C. and 50° C. | 1.1 | 0.8 |

TABLE C-continued

|  | Test | |
|---|---|---|
|  | 1 | 2 |
| Swelling, % | | |
| after 3 cycles | 0 | 0 |
| after 5 cycles | 0 | 0 |
| after 10 cycles | 2 | 2 |
| Stability | good | good |
| Outward appearance | round granules having a smooth surface | slightly angular granules with a smooth surface |

EXAMPLE V

In the manner described in Example I, there was prepared a solution of approximately 2% by weight $Mg(NO_3)_2$ in a 95% by weight aqueous ammonium nitrate solution. In this solution, dolomite with a particle size of less than 0.2 mm was suspended in a proportion of 25% by weight, calculated on the total quantity of ammonium nitrate and dolomite in the suspension.

The resulting suspension was granulated in a spouted bed under the conditions described in Example III, and using as nuclei calcium ammonium nitrate granules (26% N) with a grain size of 0.5–2.5 mm.

After an operating period of 1 hour, the granulation was discontinued, and the product was cooled in the manner described in Example III.

The resulting product had the following properties:

| Moisture content | 0.35% |
|---|---|
| Crushing strength φ 4 mm | 44.1 N |
| Density, g/m³ | 1.81 |
| Oil retention | 0.9% |
| ditto after 5 cycles between 25° C. and 50° C. | 1.1% |
| Swelling, % | |
| after 3 cycles | 0 |
| after 5 cycles | 2 |
| after 10 cycles | 3 |
| Stability | good |
| Outward appearance | round granules having a smooth surface. |

EXAMPLE VI

The suspension described in Example V was granulated in the manner described in Example IV, first test, using as nuclei calcium ammonium nitrate granules (26% N) with a grain size of 0.5–2.5 mm. After an operating period of 1 hour the granulation was discontinued and the product was cooled in the manner described in Example IV.

The conditions and results are listed in Table D.

TABLE D

| Conditions | |
|---|---|
| Air of fluidization | |
| Rate, Nm³/hour | 1000–1200 |
| Temperature, °C. | 130–140 |
| Gauge pressure, kPa | 9.8–11.8 |
| Secondary air | |
| Rate, Nm³/hour | 120 |
| Temperature, °C. | 160 |
| Pressure, kPa | 253 |
| Fluidized bed | |
| Bed height, cm | 40 |
| Temperature, °C. | 120 |
| Suspension | |
| Rate, kg/hour | 120 |
| Temperature, °C. | 160 |
| Pressure, kPa | 150 |
| Product | |
| Moisture content, % | 0.30 |
| Crushing strength, φ 4 mm N | 53.9 |
| Density, g/cm³ | 1.82 |
| Oil retention, % | 1.0 |
| ditto after 5 cycles between 25° C. and 50° C. | 1.1 |
| Swelling, % | |
| after 3 cycles | 0 |
| after 5 cycle | 0 |
| after 10 cycles | 2 |
| Stability | good |
| Outward appearance | round granules having a smooth surface. |

We claim:

1. A process for preparing stabilized, ammonium nitrate containing granules, which comprises dissolving in an aqueous ammonium nitrate solution having an ammonium nitrate concentration of at least 80% by weight $Mg(NO_3)_2$ in a proportion of 0.5–3.0% by weight, calculated on the ammonium nitrate in the solution, and suspending finely-divided mineral filler in a proportion of 0–45% by weight, calculated on the total of ammonium nitrate and filler in the suspension, spraying the resulting solution of suspension over solid nuclei while these are maintained in essentially spaced interrelationship in an agitated particle bed or mass and contacted with a hot stream of gas, while maintaining the temperature of the sprayed nuclei between 120° and 135° C., to deposit droplets of the sprayed solution or suspension on the nuclei and drying these in situ while evaporated water is removed by the stream of gas, until a desired grain size is reached, whereafter the resulting granules are cooled by means of a cooling medium to a temperature below 50° C. in such a manner that, in the cooling range of from 70° C. to 50° C., the granules remain substantially homogeneous in temperature.

2. A process as claimed in claim 1, wherein an aqueous ammonium nitrate solution with an ammonium nitrate concentration of 90–95% by weight is used.

3. A process as claimed in claims 1 or 2, wherein 1.0–2% by weight of $Mg(NO_3)_2$, calculating on the ammonium nitrate in the solution, is dissolved in the ammonium nitrate solution.

4. A process as claimed in any of claims 1 or 2, wherein said mineral filler is limestone, marl, chalk, dolomite, magnesium carbonate and/or magnesium sulfate.

5. A process as claimed in any of claims 1 or 2, wherein the solution or suspension is sprayed over nuclei in a fluidized bed, a spouted bed, or a combination of these bed types.

6. A process as claimed in any of claims 1 or 2, wherein the granules are cooled in the cooling range of from 70° C. to 50° C. at a uniform cooling rate of no more than 3° C. per minute.

7. A process as claimed in claim 6, wherein the granules are cooled in a cooling drum by means of air of 25°–35° C. which has been pre-treated to remove water.

* * * * *

UNITED STATES PATENT AND TRADEMARK OFFICE
CERTIFICATE OF CORRECTION

PATENT NO. : 4,316,736
DATED : February 23, 1982
INVENTOR(S) : Van Hijtfe, et al.

It is certified that error appears in the above–identified patent and that said Letters Patent are hereby corrected as shown below:

Column 13, line 34: "Density, $g/m^3$" should be --Density, $g/cm^3$--.

Signed and Sealed this

Third Day of August 1982

[SEAL]

Attest:

GERALD J. MOSSINGHOFF

*Attesting Officer*  *Commissioner of Patents and Trademarks*